May 28, 1963
W. T. MILANOVITS ETAL
3,091,260
PIPELINE STOPPING TOOL
Filed May 31, 1960
2 Sheets-Sheet 1
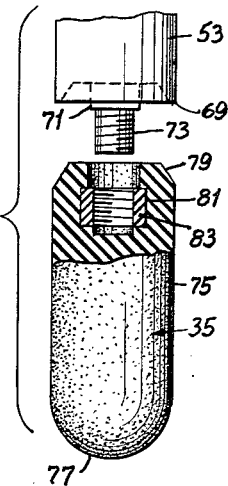
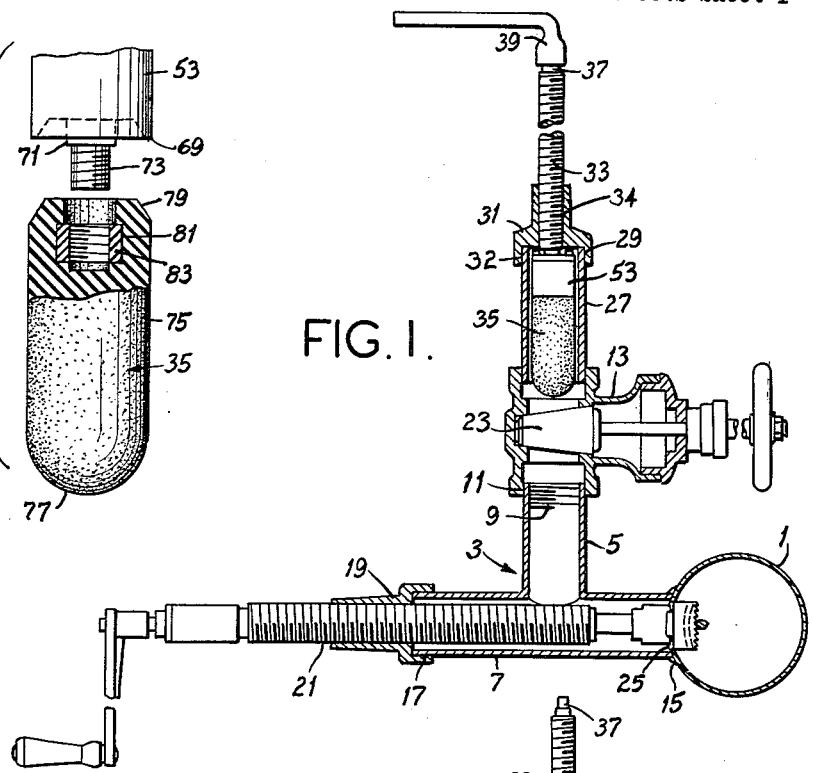
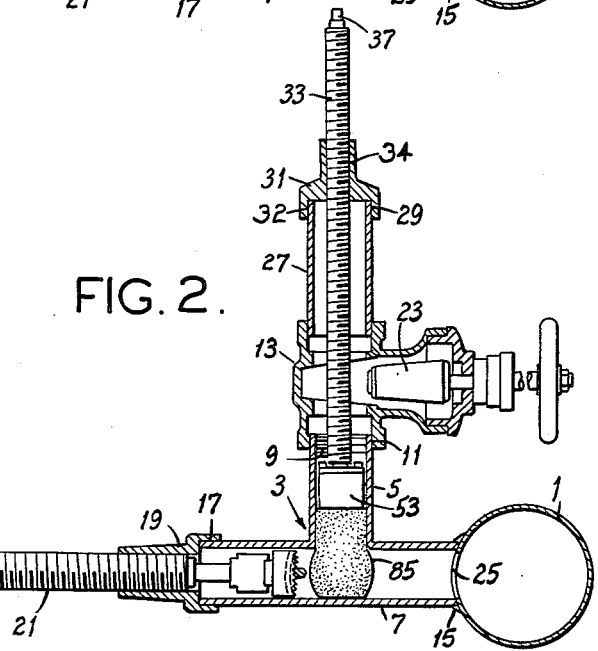
William T. Milanovits,
Thomas Milanovits,
Inventors.
Koenig and Pope,
Attorneys.

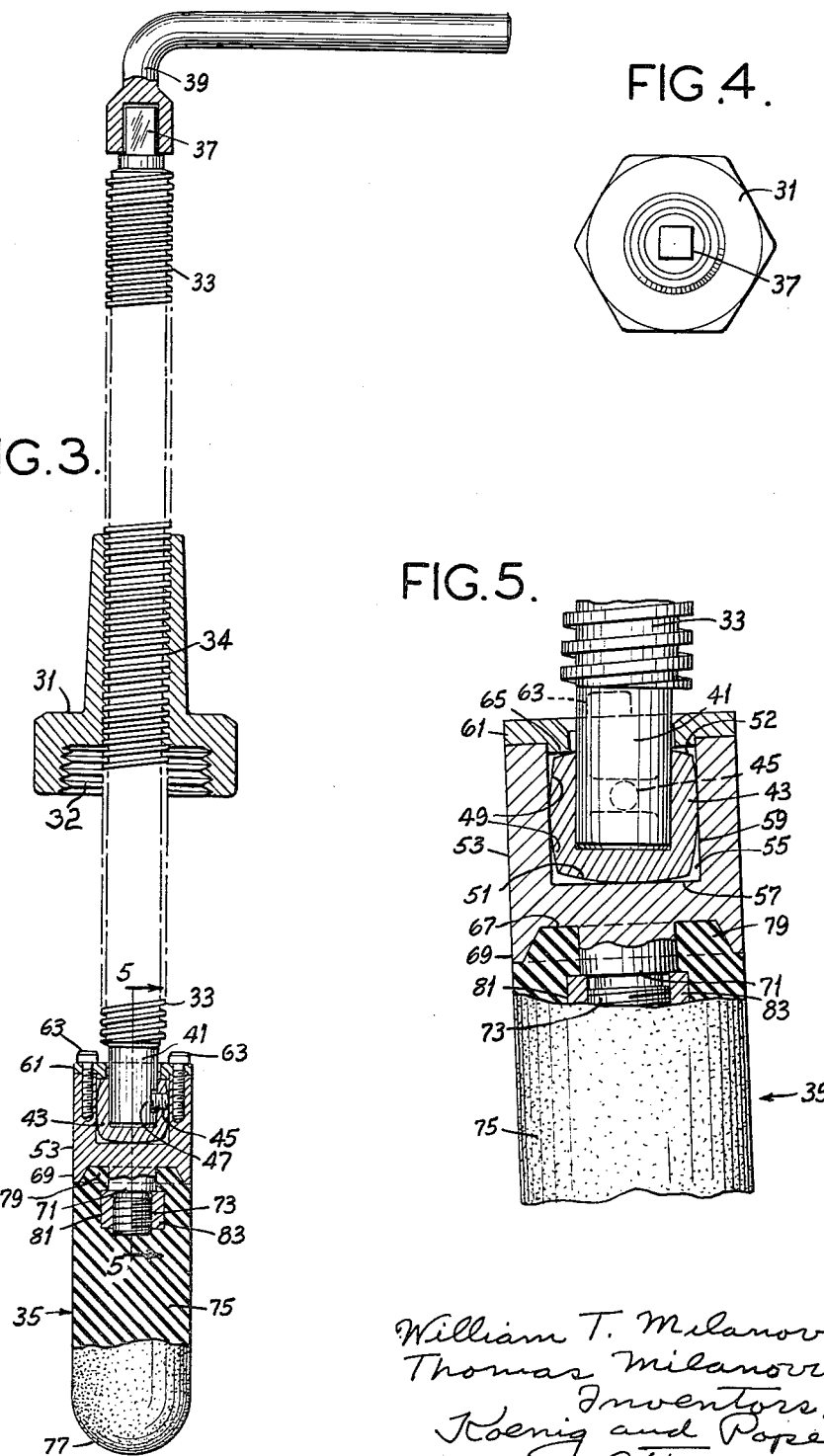

3,091,260
PIPELINE STOPPING TOOL
William T. Milanovits, Crestwood, and Thomas Milanovits, Richmond Heights, Mo., assignors to M. L. Mfg. Co., Manchester, Mo., a corporation of Missouri
Filed May 31, 1960, Ser. No. 32,677
5 Claims. (Cl. 138—94)

This invention relates to pipeline stopping tools, and more particularly to tools of this class employing resilient stopper heads.

Among the several objects of the invention may be noted the provision of a pipeline stopping tool having a resilient stopper head which will compensate for misalignments; the provision of a pipeline stopping tool which under conditions of proper alignment or misalignment will not score upon seating; and the provision of a tool of the class described which is convenient, light, simple to operate and which minimizes valuable materials to be discarded when its stopper head requires replacement. Other objects and features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, FIG. 1 is a diagrammatic vertical section of certain auxiliary pipeline fittings, showing a preliminary application of our stopping tool thereto;

FIG. 2 is a view similar to FIG. 1, showing a stopping position of the tool;

FIG. 3 is an enlarged axial section through the tool, parts being shown in elevation;

FIG. 4 is a top plan view of FIG. 3 but with the wrench shown in FIG. 3 removed;

FIG. 5 is a further enlarged axial section taken on line 5—5 of FIG. 3; and

FIG. 6 is a side elevation, partly in section, showing a resilient stopper head part removed from the tool.

Corresponding reference characters indicate corresponding parts throughout the several views of the drawings.

While the invention will be described as used in connection with a gas pipeline, it will be understood that it is applicable to any fluid-carrying pipelines.

Referring now more particularly to FIGS. 1 and 2, numeral 1 indicates a main pipeline to which a lateral connection is to be made. This generally involves welding to the outside of the pipe 1 a T 3 which has a pipe stem 5 and a leader 7. This is done prior to cutting into pipe 1. The required welding is shown at 15. The pipe stem 5 is internally threaded as shown at 9, and externally threaded as shown at 11 to receive a stop valve 13. The leader 7 is externally threaded at 17 temporarily to receive a nut 19, which is internally threaded for the reception of a drilling, cutting and slug-retrieving tool 21 of the general type described in our copending United States patent application Serial No. 823,574, filed June 29, 1959 and issued as Patent No. 2,972,915. Before application of the tool 21 (including its attaching nut 19), the pipe 1 is closed. At this time the gate 23 of the valve 13 is closed. Under these conditions, the tool 21 may be operated to cut a hole 25 in the pipe 11 and retrieve the slug into position behind the stem 5. It remains then to remove the tool 21, including its nut 19 from leader 7 and to couple it to system pipes to be connected. This requires temporary plugging of the leader 7.

In order to provide for removal of the tool 21 from its position as shown in FIG. 2, a length of pipe 27 is threaded into the valve 13. This pipe is also threaded at its outer end 29 for the temporary reception of a nut 31, forming part of our new tool. The nut 31 is internally threaded at 32 for making the threaded connection at 29. The nut 31 is also internally threaded at 34 for the reception of an axially movable threaded drive shank 33, on one end of which is located a swiveling stopper shown generally at 35, and at the other end of which is a polygonal head 37 for a removable drive wrench 39. The threads 34 between the nut 31 and screw 33 are of sufficient length and close enough fit that with lubricant grease therebetween substantial fluid leakage therethrough is inhibited.

The pipe 27 is of sufficient length to receive the head 35 behind the valve gate 23 when the latter is closed (FIG. 1). Upon opening the gate 23 (FIG. 2), and threading shank 33 through nut 31, the head 35 may be moved through pipes 5 and 27 and through the valve into the leader 7. Thereafter the cutting tool 21 may be removed from leader 7, along with its nut 19. Then whatever branch lines are to be put into communication with the pipe 1 may be attached to the leader 7. Thereafter the stopper 35 may be retracted to the FIG. 1 position and the gate 23 closed. Then the tool of the invention may be removed by disconnecting the nut 31. If it is desired to remove the gate valve in order to retrieve it, a suitable plug-handling tool may be employed to insert a threaded plug (not shown) into threads 9 before the valve 13 is removed. Further details regarding such a plug-handling tool are not necessary herein because such are known to those skilled in the art.

The above sets forth the known environment for our new tool shown generally in FIGS. 1 and 2 and which is shown in detail in FIGS. 3–5. As shown in the latter, the lower end of the threaded shank 33 is provided with a reduced unthreaded extension 41, for the rigid reception of a barrel-shaped male keeper head 43 carrying a set screw 45 which engages with a flat seat 47 formed on one side of the extension 41. The outside of the cup-shaped head 43 is rounded at its ends to form an exterior barrel shape, as is shown at numeral 49 in FIG. 5. Its bottom is shaped as a rounded surface, as shown at 51. Its top margin is also rounded as shown at 52. The purpose of the roundings 49 and 51 is to form head 43 as a keeper for the stopper 35, which will allow the stopper 35 to rotate and swivel transversely as suggested in FIG. 5.

The stopper 35 as such is composed of a metal female head 53, shaped interiorly as a cylindrical cup 55, the sides of which are adapted to rock on the rounded barrel shape 49 of the keeper head 43. The flat bottom 57 of head 53 is designed to rock on the rounded surface 51. A flange ring 61 is attached to the head 53 by means of bolts 63. This ring includes an annular nose part 65 having rocking engagement with the rounded part 52 of the keeper 43. Thus the head 53 has a rotary and universal swivel engagement with the keeper 43. By means of the swiveling construction described, the undesirable costly features of more highly frictional spherical ball and socket joints are avoided. The present joint has less friction because of the small areas of sliding contact afforded, particularly under the usually adverse conditions of dirt, moisture and deleterious atmospheres and the like encountered in pipeline construction.

The lower surface of the female head 53 is annularly countersunk, as shown at 67, being provided with a hollow conical flange 69 and a central boss 71, threaded at its end as shown at 73. At 75 is shown a resilient plug of cylindrical form, rounded at the lower end, as shown at 77. This plug may be composed of rubber, synthetic rubber, or the like. At its other end it is provided with a resilient annular exteriorly conical nose 79, providing a central opening 81 in which is embedded a nut 83 the margin of which is molded therein at the time that the member 75 is formed, being thus anchored therein. The nut 83 is applicable to and removable from the threads 73, so that the plug 75 by turning may be applied to and removed from the head 53, as illustrated in FIG. 6. The connection between members 53 and 75 has the advantage that in the event the resilient material of the plug 75 deteriorates with time, the plug (including the embedded nut 83) may be removed and replaced by a new resilient plug 75 having a like embedded nut. Thus when a replacement is made, the only loss of material is that in the worn-out resilient part 75 and the low-cost nut 83 embedded therein.

An advantage of the conical engagement between the female cone 69 and the male cone 79 is in part due to the interlocking clutch effect which prevents a spontaneous loss of the plug 75 during operations. On the other hand, the clutch effect is automatically terminated when head 53 is held and the plug 75 is manually turned for removal. The conical connection also prevents the upper end of the plug 75 from improperly splaying outward when the plug is compressed as shown in FIG. 2, which would tend to damage the upper portion of the plug. While a straight-sided conical form is shown, it will be understood that the term conical includes other conical shapes the sides of which are other than straight, as for example, being convex or concave.

Referring to FIG. 2, it will be seen that as the screw 33 is turned down, the rounded ends 77 of the plug 75 will engage the leader 7. The resulting axial squeezing action thus engendered expands the plug 75 to form a sealing ball-like bulge 85 in the leader 7 and a cylindrical seal in the pipe stem 5. It will be seen that the swiveling action between parts 43 and 35 will compensate for any misalignments between various parts such as 27, 13, 5 and 7. Thus the head 35 can readily be snaked through any misaligned parts such as 27, 13 and 5 and will form a thoroughly effective seal, even though parts 5 and 7 may also not be precisely at the indicated right angle intended between them. Moreover, the free relative rotation afforded between the keeper 43 and the head 53 under adverse conditions permits the soft end 77 of the member 75 to attain a seat without scoring rotation against the leader 7. Moreover, the seating of the remaining surfaces of the resilient plug 75 as expansion occurs (FIG. 2) is effected without relative scoring motion. Thus scoring of the soft member 75 is prevented upon seating. The same advantage accrues upon retraction. When the screw 33 is backed off, the resilient plug 75 will return to its more or less cylindrical shape for convenient snaking out and withdrawal.

The advantages above set forth in the objects of the invention are thus obtained, namely, provision of compensation for misalignments and nonscoring seating, as well as a tool which is convenient, light and simple to operate. Minimization of the need for discarding valuable parts upon making replacements of the stopper 35 is also of importance, noting that the only metal part lost in the process is the low-cost nut 83 in addition to the loss of any deteriorated resilient plug portions 75.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A pipeline stopping tool comprising a threaded nut, a screw part threaded therethrough, said screw part having on one side of the nut a part adapted for turning of the screw part, a keeper head located upon the end of the screw part on the other side of the nut, a stopper consisting of a nonresilient head adapted to rotate and transversely swivel with respect to said keeper head, said nonresilient head having an endwise annular socket and a central threaded boss extending from said socket, said stopper also including an attachable and detachable resilient plug having an annular resilient end forming an opening and adapted to be received in said annular end of the nonresilient head and to surround said boss, said opening in the resilient plug containing a threaded nut anchored therein and adapted to be threaded to and removed from said threaded boss.

2. A pipeline stopping tool comprising a threaded nut, a screw part threaded therethrough, said screw part having on one side of the nut a part adapted for turning of the screw part, a keeper head upon the end of the screw part on the other side of the nut, a stopper consisting of a nonresilient head adapted to notate and transversely swivel on said keeper head, said nonresilient head having an endwise annular conical socket and a central threaded boss extending therefrom, said stopper also including an attachable and detachable resilient plug having an annular resilient conical end forming an opening and adapted to be received in said conical end of the nonresilient head and to surround said boss, said opening in the resilient plug containing an anchored threaded nut adapted to be threaded to and from said threaded boss.

3. A pipeline stopping tool according to claim 2, wherein said anchored threaded nut has its margins molded into the resilient plug with its threads located in said opening in the plug whereby they are adapted to be reached by the threads of said boss.

4. A pipeline stopping tool comprising a threaded nut, a screw part threaded therethrough, said screw part having on one side of the nut a part adapted for turning of the screw part, a barrel-shaped keeper head upon the end of the screw part on the other side of the nut, a stopper consisting of a cylindrically hollow nonresilient head containing said keeper head and adapted to rotate and transversely swivel with respect thereto, said nonresilient head having an endwise annular conical socket and a central threaded boss extending therefrom, said stopper also including an attachable and detachable resilient plug having an annular resilient conical end forming an opening and adapted to be received in said conical end of the nonresilient head and to surround said boss, said opening in the resilient plug containing a molded-in threaded nut adapted to be threaded to and from said threaded boss by turning said resilient plug relative to said nonresilient head.

5. A pipeline stopping tool according to claim 4, wherein said cylindrically hollow nonresilient head is closed at one end by an inwardly directed flange, the bottom of the cylinder in said nonresilient head is substantially flat, and opposite ends of said keeper head are bulged for engagement with said flat bottom and inwardly directed flange respectively.

References Cited in the file of this patent

UNITED STATES PATENTS

| | | |
|---|---|---|
| 1,833,700 | Wolf | Nov. 24, 1931 |
| 2,925,246 | Sardeson | Feb. 16, 1960 |

FOREIGN PATENTS

| | | |
|---|---|---|
| 524,395 | Belgium | Dec. 15, 1953 |
| 520,456 | Canada | Jan. 10, 1956 |
| 1,127,557 | France | Dec. 19, 1956 |
| 1,016,084 | Germany | Sept. 19, 1957 |